R. C. SWANN.
Smut Machine.

No. 55,788.

Patented June 19, 1866.

WITNESSES:

INVENTOR.

United States Patent Office.

R. C. SWANN, OF BROWNSVILLE, INDIANA, ASSIGNOR TO HIMSELF, JOHN L. RITER, AND T. JEFFERSON WEST, OF SAME PLACE.

IMPROVEMENT IN SMUT-MACHINES.

Specification forming part of Letters Patent No. 55,788, dated June 19, 1866.

*To all whom it may concern:*

Be it known that I, R. C. SWANN, of Brownsville, in the county of Union and State of Indiana, have invented a new and Improved Smut-Mill; and I do hereby declare that the following is a full, clear, and exact description thereof, which will enable others skilled in the art to make and use the same, reference being had to the accompanying drawings, forming part of this specification, in which—

Figure 1:
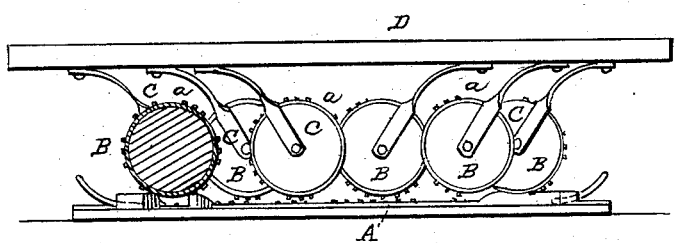
Figure 2:
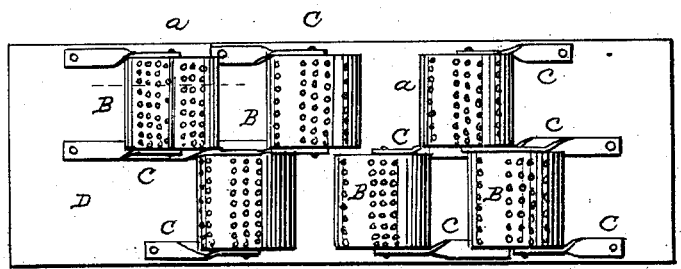
Figure 3:
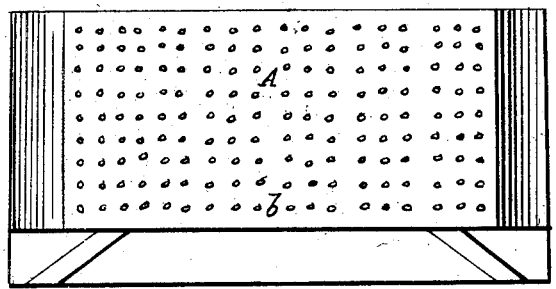

Figure 1 is a front view of my invention, one of the rollers of the same being in section, as indicated by the line $x\ x$, Fig. 2; Fig. 2, an inverted plan or under view of the roller portion of the same; Fig. 3, a plan or top view of the screen or perforated bed-piece pertaining to the same.

Similar letters of reference indicate like parts.

This invention relates to a new and improved smut-mill or scouring device for the purpose of cleaning grain, depriving it of smut and other impurities, and capable of being applied to an ordinary fanning-mill, thrashing-machine, or fitted up in a flouring-mill.

The invention consists of a perforated bed or screen having a reciprocating motion imparted to it, and a series of fixed pressure-rollers having the bearings of their journals in springs, which cause the rollers to press upon the screen, the roughness of the latter, in connection with the surface of the rollers, which are also rough, subjecting the grain as it passes over the screen to a sufficient scouring action, which loosens or detaches the smut and dirt from the grain, so that it may be expelled by the blast from a fan.

A represents a perforated bed or screen arranged in any suitable way so that it may have reciprocating motion imparted to it. This bed or screen may be constructed of sheet metal perforated from its under side, so that the edges of the perforation at the upper side of the screen will form a burr, giving a roughness to said side. (See Fig. 1.)

B represents a series of rollers, which may be constructed of wood covered with sheet metal $a$, perforated from its inner side, so as to produce a rough exterior surface. The journals of these rollers B are fitted in springs C, which are attached to a plate or board, D, secured to any fixture above the bed or screen A, and at such a height as to admit of the springs C pressing the rollers B upon the bed or screen. (See Fig. 1.)

The grain passes upon one end, $b$, of the bed or screen, which end may be slightly elevated, and the bed or screen having a reciprocating motion imparted to it, the grain will be subjected to a very efficient scouring action between the upper surface of the screen and rollers, an operation which will loosen all smut and dirt which may adhere to the grain, and this smut and dirt may be blown off by a blast from a fan below the bed or screen, the perforations in the latter admitting of the blast passing through it. The grain, therefore, will pass off from the bed or screen in a clean state.

This simple device may be applied to an ordinary fanning-mill or to a thrashing-machine, or it may be fitted up, separately or independently of other machinery, in a flouring-mill.

Having thus described my invention, I claim as new and desire to secure by Letters Patent—

The reciprocating perforated bed or screen A, in combination with the pressure-rollers B, having a rough periphery, and their journals fitted in springs C, all arranged to operate in the manner substantially as and for the purpose set forth.

The above specification of my invention signed by me this 28th day of February, 1866.

R. C. SWANN.

Witnesses:
J. A. SMITH,
JAMES BEDELL.